United States Patent
Connolly et al.

(10) Patent No.: US 10,476,937 B2
(45) Date of Patent: Nov. 12, 2019

(54) ANIMATION FOR IMAGE ELEMENTS IN A DISPLAY LAYOUT

(71) Applicant: Facebook, Inc., Menlo Park, CA (US)

(72) Inventors: Christopher James Connolly, San Francisco, CA (US); Thomas Frederick Dimson, Stanford, CA (US); Majd Taby, San Francisco, CA (US); Gregor Hochmuth, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 950 days.

(21) Appl. No.: 14/519,008

(22) Filed: Oct. 20, 2014

(65) Prior Publication Data

US 2016/0110063 A1    Apr. 21, 2016

(51) Int. Cl.
*H04L 29/08* (2006.01)
*G06F 9/451* (2018.01)
*G06F 3/0484* (2013.01)
*G06Q 50/00* (2012.01)
*G06F 3/0488* (2013.01)
*G06F 3/0482* (2013.01)

(52) U.S. Cl.
CPC ............ *H04L 67/10* (2013.01); *G06F 3/0482* (2013.01); *G06F 3/0488* (2013.01); *G06F 3/04842* (2013.01); *G06F 3/04845* (2013.01); *G06F 9/451* (2018.02); *G06Q 50/01* (2013.01)

(58) Field of Classification Search
CPC .. G06F 3/0488; G06F 3/04845; G06F 9/4443; G06F 3/04842; G06F 3/0482; G06F 9/451; G06Q 30/0277; G06Q 50/01; H04L 67/10; H04L 67/02; H04L 67/306
See application file for complete search history.

(56) References Cited

U.S. PATENT DOCUMENTS

| | | | | |
|---|---|---|---|---|
| 2011/0164042 A1* | 7/2011 | Chaudhri | ............. | G06F 3/0481 345/473 |
| 2012/0084362 A1* | 4/2012 | McBrearty | ......... | G06Q 30/0269 709/204 |
| 2012/0323704 A1* | 12/2012 | Steelberg | ............ | G06Q 30/0268 705/14.73 |
| 2013/0198634 A1* | 8/2013 | Matas | ..................... | G06T 11/60 715/717 |
| 2013/0335425 A1* | 12/2013 | Haase | ..................... | G06T 13/00 345/473 |
| 2015/0095804 A1* | 4/2015 | Grossman | ............. | G06F 3/0482 715/753 |

(Continued)

*Primary Examiner* — Arpan P. Savla
*Assistant Examiner* — Maria S Ayad
(74) *Attorney, Agent, or Firm* — Baker Botts L.L.P.

(57) ABSTRACT

Particular embodiments provide a plurality of image elements arranged in a display layout. When user input selecting one of the image elements is received, a first animation sequence for an information panel associated with the selected image element may be displayed, wherein the information panel swings down from a bottom edge of the selected image element. As the information swings down, the selected image element may also be enlarged until it reaches a pre-determined size with respect to a display of the computing device. In response to receiving user input dismissing the selected image element, another animation sequence may shrink the selected image element while showing the information panel swinging up and eventually disappearing.

20 Claims, 8 Drawing Sheets

(56) References Cited

U.S. PATENT DOCUMENTS

| | | | | |
|---|---|---|---|---|
| 2015/0172327 A1* | 6/2015 | Wansley | ............. | G06F 3/04842 |
| | | | | 715/753 |
| 2015/0178681 A1* | 6/2015 | Agarwal | .............. | G06Q 10/101 |
| | | | | 705/26.8 |
| 2015/0331573 A1* | 11/2015 | Zhu | ....................... | G06F 3/0481 |
| | | | | 715/800 |
| 2016/0078522 A1* | 3/2016 | Sakazume | ........... | G06F 3/04812 |
| | | | | 705/14.73 |
| 2017/0097715 A1* | 4/2017 | Kim | .................... | H04M 1/0266 |

* cited by examiner

ANIMATION FOR IMAGE ELEMENTS IN A DISPLAY LAYOUT

TECHNICAL FIELD

This disclosure generally relates to presenting image and video content for display.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments comprise displaying animation sequences for concurrently-displayed image elements arranged in a display layout. Particular embodiments may receive user input selecting one of the image elements and proceed to display a first animation sequence in response to the user input. The first animation sequence may show the selected image element enlarging in size until it reaches a maximum size. The first animation sequence may also show an information panel appearing and swinging down from a bottom edge of the selected image element, wherein the information panel includes information associated with the selected image element. If the selected image element is associated with a video, upon completion of the first animation sequence, the video may begin playing.

Upon receiving user input dismissing the selected image element, particular embodiments may display a second animation sequence that shows the selected image element shrinking in size back to its original size when shown in the display layout. The first animation sequence may also show the information panel swinging up and disappearing. If the selected image element is associated with a video that was playing, the selected image element may be updated to display the last video frame being displayed at the moment when the user input dismissing the selected image element was received. In particular embodiments, at the end of the second animation sequence, the selected image element is once again displayed in its original position in the display layout.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
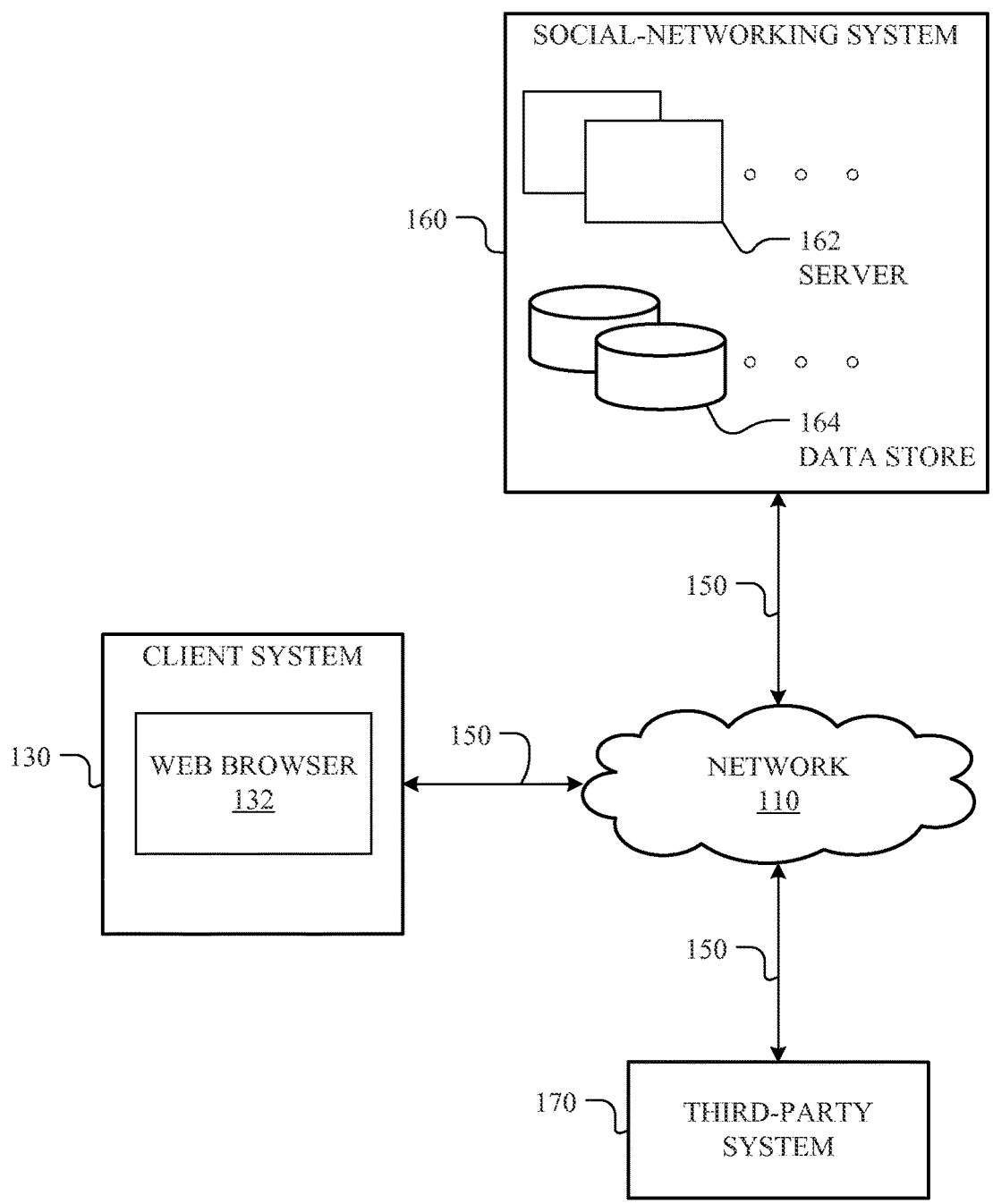
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
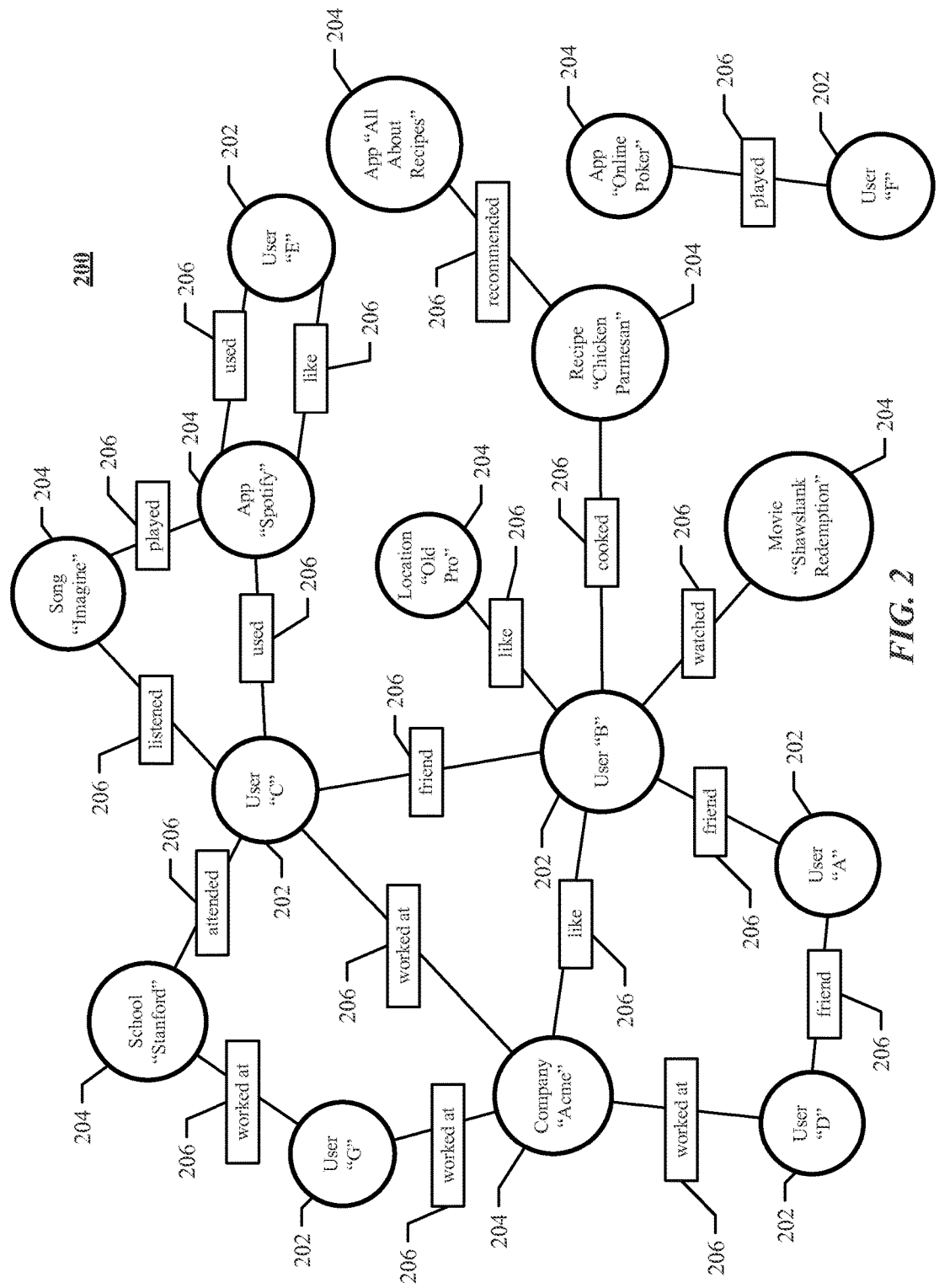
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY®, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY®) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY®").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. US 2012/0203831, entitled "Sponsored Stories Unit Creation from Organic Activity Stream" and filed 3 Feb. 2012 as U.S. patent application Ser. No. 13/020,745, or U.S. Patent Application Publication No. US 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement.

Social-networking-system functionality or context may be associated with an advertisement in any suitable manner. For example, an advertising system (which may include hardware, software, or both for receiving bids for advertisements and selecting advertisements in response) may retrieve social-networking functionality or context from social-networking system 160 and incorporate the retrieved social-networking functionality or context into the advertisement before serving the advertisement to a user. Examples of selecting and providing social-networking-system functionality or context with an advertisement are disclosed in U.S. Patent Application Publication No. US 2012/0084160, entitled "Providing Social Endorsements with Online Advertising" and filed 5 Oct. 2010 as U.S. patent application Ser. No. 12/898,662, and in U.S. Patent Application Publication No. US 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or context may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. US 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. US 2009/0070219, entitled "Targeting Advertisements in a Social Network" and filed 20 Aug. 2008 as U.S. patent application Ser. No. 12/195,321; U. S. Patent Application Publication No. US 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. US 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. US 2012/0159635, entitled "Comment Plug-In for Third-Party System" and filed 15 Dec. 2010 as U.S. patent application Ser. No. 12/969,368; U.S. Patent Application Publication No. US 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Patent Application Publication No. US 2008/0040475, entitled "Providing a News Feed Based on User Affinity in a Social Network Environment" and filed 11 Aug. 2006 as U.S. patent application Ser. No. 11/503,093; U.S. Patent Application Publication No. US 2012/0072428, entitled "Action Clustering for News Feeds" and filed 16 Sep. 2010 as U.S. patent application Ser. No. 12/884,010; U.S. Patent Application Publication No. US 2011/0004692, entitled "Gathering Information about Connections in a Social Networking Service" and filed 1 Jul. 2009 as U.S. patent application Ser. No. 12/496,606; U.S. Patent Application Publication No. US 2008/0065701, entitled "Method and System for Tracking Changes to User Content in an Online Social Network" and filed 12 Sep. 2006 as U.S. patent application Ser. No. 11/531,154; U.S. Patent Application Publication No. US 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. US 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. US 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Particular embodiments comprise rendering animation sequences for concurrently-displayed image elements in a display layout. An image element may comprise a picture, a map, a story block of text, a page of a document, an icon, a thumbnail image, a video or portion of a video (e.g., a still frame), or any other suitable type of visual representation of information. In particular embodiments, the display layout of concurrently-displayed image elements may be presented in the form of a contiguous array of image elements or a display grid of image elements. In particular embodiments, the concurrently-displayed image elements may visually overlap in the display layout. In particular embodiments, the display layout of concurrently-displayed image elements may be presented with the appearance of a three-dimensional format or a two-dimensional format. Particular embodiments determine a layout for the concurrently-displayed image elements (e.g., in an array, display grid, or spread-out stack). Image elements may, for example, be placed into a display layout that corresponds to specifications for a displayable region of a screen associated with a computing device. Particular embodiments of the determination of a display layout for image elements (e.g., in an array or display grid) is discussed in further detail in U.S. patent application Ser. No. 13/677,132, titled "Hierarchical User Interface" and filed 14 Nov. 2012, which is incorporated herein by reference. The matching of a candidate image element to an unoccupied position in a display layout is discussed in further detail in U.S. patent application Ser. No. 13/932,932, titled "Flexible Image Layout" and filed 1 Jul. 2013, which is incorporated herein by reference. In particular embodiments, if user input is received to change the size of a selected image element or change the order of image elements, the display layout may be re-rendered. Rendering of a display layout comprising an array of contiguous image elements is discussed in further detail in U.S. patent application Ser. No. 13/715,636, titled "Rendering Contiguous Image Elements" and filed 14 Dec. 2012, which is incorporated herein by reference.

Figure 3C:
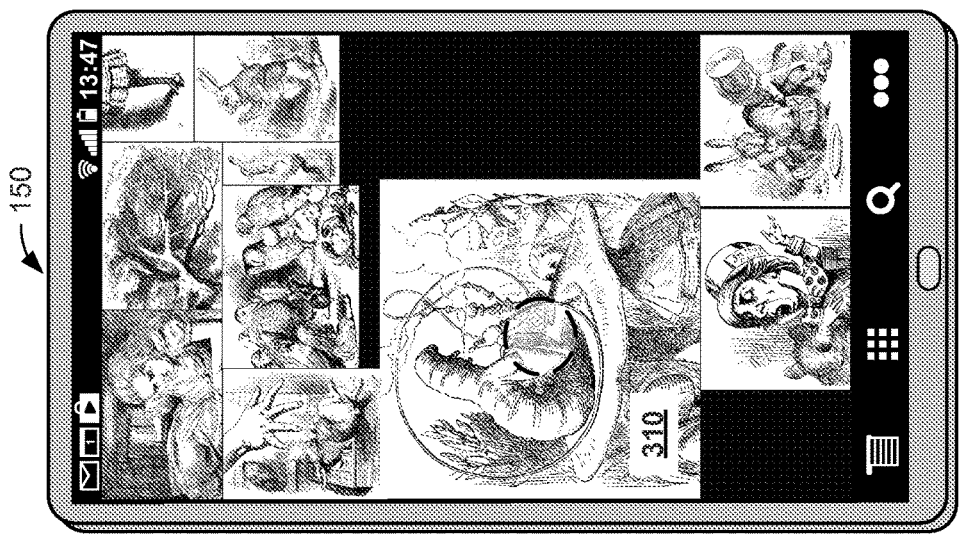
FIGS. 3A-3F illustrate an animation sequence for an example display of image elements presented on a displayable region of a screen of a computing device.
Figure 3B:
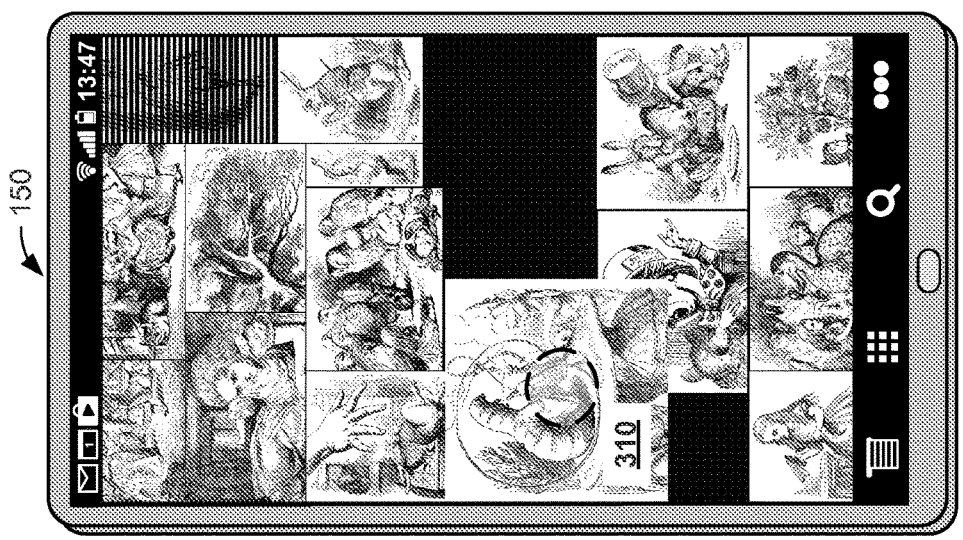
Figure 3A:
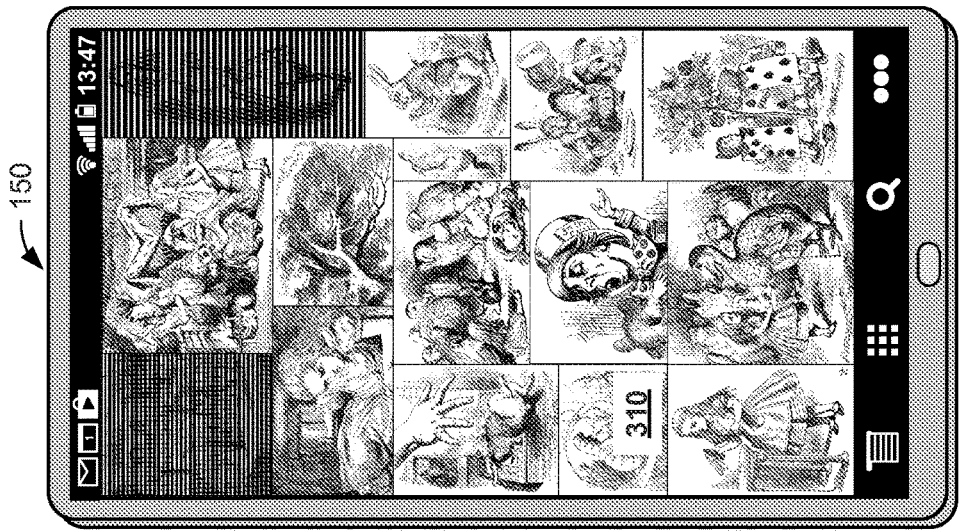

FIGS. 3A-3F illustrate an animation sequence for an example display layout of image elements presented on a displayable region of a screen of a computing device (e.g., a mobile phone). In the example of FIG. 3A, image element 310 is one of multiple image elements arranged in a contiguous array, with the image elements in the array being of various sizes. The image elements in the array may originate from any of a variety of sources including, for example, a social-networking system. As an example, each of the image elements may be associated with one or more users (e.g., people, businesses, or other entities) of the social-networking system. In particular embodiments, a user may interact with one or more image elements in an array. The user may use any suitable input device (e.g., one or more fingers or a stylus) to interact with the image elements. Furthermore, the user may perform any suitable gesture or action (using one or more input devices) with respect to one or more image elements in an array. For example, the user may perform a single or double tap, press, swipe, pinch open or close, or other gesture to play or pause a video associated with an image element, or select, zoom, pan, or rotate an image associated with an image element. Any suitable interaction between a user and an image element may be performed, and any suitable visual display associated with an interaction (e.g., an animation sequence) may be displayed to the user upon determination that an interaction with an image element has occurred. In particular embodiments, a user's interaction with an image element may result in different behaviors (e.g., transitions or animations) depending on whether the image element is displayed in an array or whether the image element is displayed in a larger mode (e.g., upon being selected).

Figure 3F:
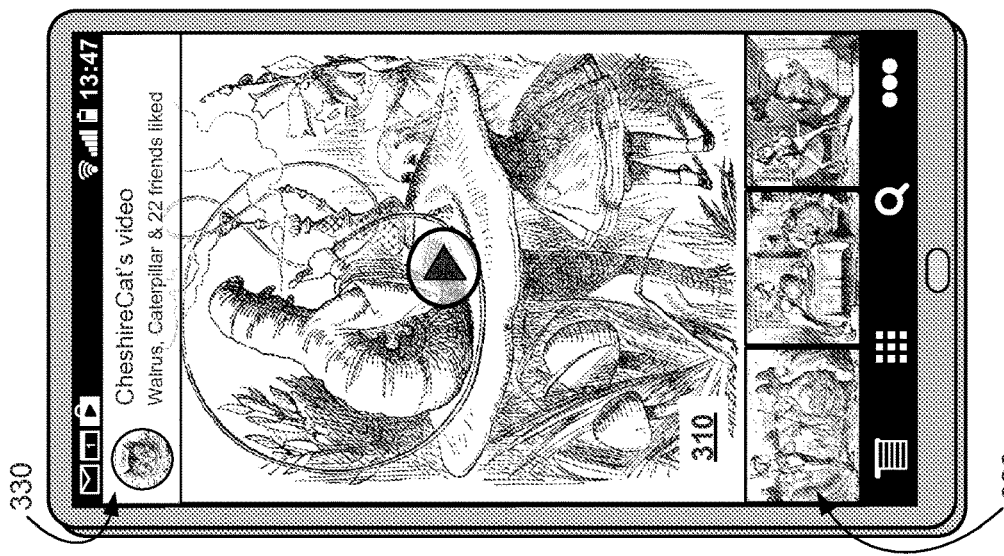

In the example of FIG. 3B, user input (e.g., a touch gesture, indicated for reference only by a white circle) to select image element 310 is received. In the example of FIG. 3B, in response to the user's input, an animation sequence may begin. In the animation sequence, image element 310 begins to grow in size, occupying a larger area of the display, and other image elements in the array begin to rearrange, grow smaller in size, and move to the background. In the example of FIG. 3C, the animation sequence continues, with image element 310 further growing in size, and the other image elements in the array moving off of the screen until image element 310 fills the entirety of the screen in at least one dimension (e.g., the width of the screen, as shown in FIG. 3F). In particular embodiments, as shown in FIGS. 3A-3F, the animation sequence may depict adjacent image elements in the display layout moving aside to make room for image element 310 to grow in size.

Figure 3E:
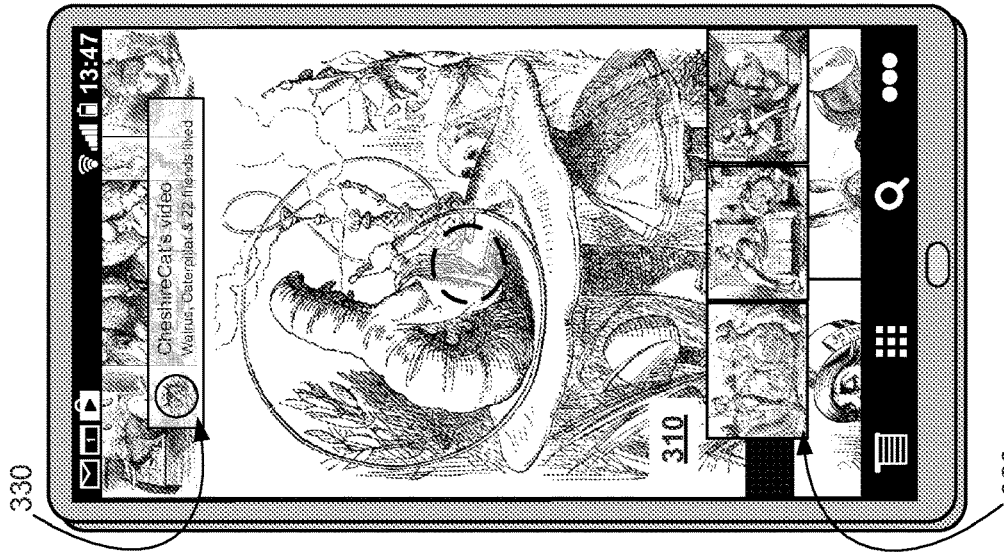
Figure 3D:
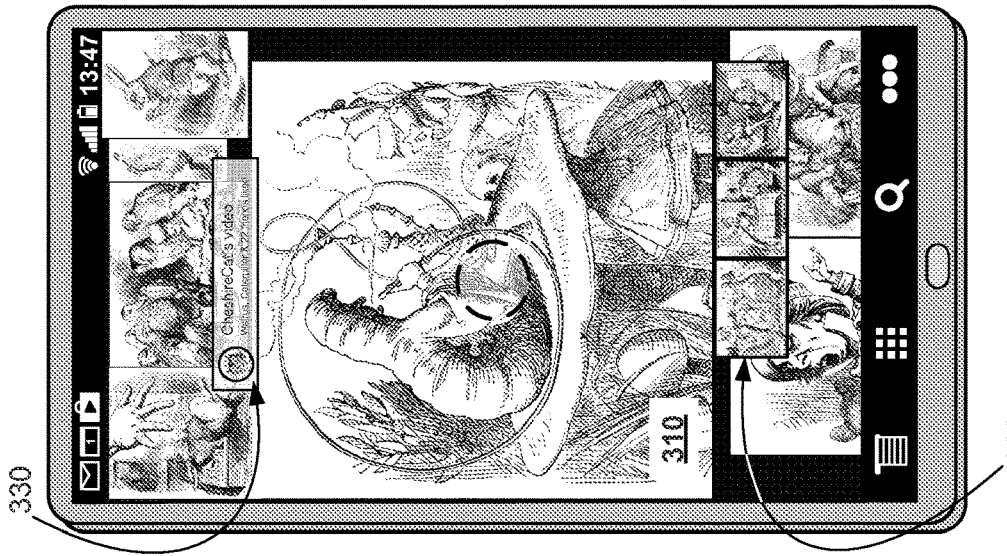

In FIGS. 3D-3F, image element 310 continues to grow in size in the animation sequence, and a new set of image elements 320 move into the display region. The additional image elements 320 may, for example, include one or more image elements that are somehow related to selected image element 310 (e.g., they may have been uploaded by the same user of social-networking system 160, they have content and/or subjects similar to the content and/or subjects depicted in image element 310, they are likely to be of interest to a user who has selected image element 310, they may have been uploaded by a user of social-networking system 160 on the same day or around the same time as image element 310, they may be associated with metadata indicating a location within a threshold proximity of a location associated with image element 310, they may be associated with social-graph nodes with which image element 310 is also associated, etc.). In particular embodiments, user input selecting one of the additional image elements 320 may take the user to a view of the selected additional image element 320 (e.g., without returning to the array view). In particular embodiments, the version of the image element 310 displayed in the array may be different (e.g., may be differently cropped or scaled, or may have a different aspect ratio) than the version of the image element 310 displayed after the animation sequence is complete (e.g., in FIG. 3F).

FIGS. 3D-3F also illustrate the appearance of information element 330 associated with image element 310. Information element 330 may, for example, include any suitable information associated with image element 310 including a username of a user who is the originator (e.g., uploader) of image element 310, an image or likeness associated with the user who is the originator of image element 310 (e.g., an avatar or profile picture), an indication (e.g., usernames) of one or more other users who have interacted with image element 310 (e.g., by "liking" or "favoriting", commenting upon, sharing, or tagging image element 310), an indication of the number of users who have interacted with image element 310, or any other suitable information associated with image element 310 (e.g., a caption associated with the image element, one or more tags of users or other entities associated with the image element, data associated with a location, date, or time associated with the image element, etc.). Information element 330 may include any suitable information associated with image element 310 and may be user generated, automatically generated, locally generated (e.g., at a client device), or remotely generated (e.g., at a server) and locally presented (e.g., at a client device). Although the examples of FIGS. 3D and 3E illustrate additional content (e.g., additional image elements 320 and information element 330) displayed with an expanded view of image element 310, in other embodiments, image element 310 is displayed alone (e.g., in a full-screen mode) once it is selected.

In yet other embodiments, additional user input (e.g., a double tap) may be required to transition image element 310 to a full-screen mode. FIG. 3F illustrates the final position of image element 310 once the animation sequence responsive to user input selecting image element 310 is completed. In FIG. 3F, image element 310 fills a substantial portion of a display region of a screen of a computing device. The position or size (e.g., dimensions) of image element 310 as displayed after selection may, for example, be predetermined and may depend on the characteristics of the computing device on which selected image element 310 is displayed. In particular embodiments, image element 310 as displayed after an animation sequence may include an "x" (or any other suitable button or icon) that allows the user to dismiss the image element, to be described in further detail below.

FIGS. 4A-4D illustrate an example portion of an animation sequence associated with the selection of image element 310. Although not depicted in the sequence of FIGS. 4A-4D, the selected image element 310 may (as shown in the animation sequence depicted in FIGS. 3A-3F) grow progressively larger on the display while other image elements in the display layout reduce in size, rearrange, or move to the background (and yet others increase in size, rearrange, or move forward from the background to the foreground). In the example of FIGS. 4A-4D, the animation sequence also includes the animated appearance of information panel 330, which is associated with image element 310. The information panel 330 may, for example, include any suitable information associated with image element 310.

Figure 4A:
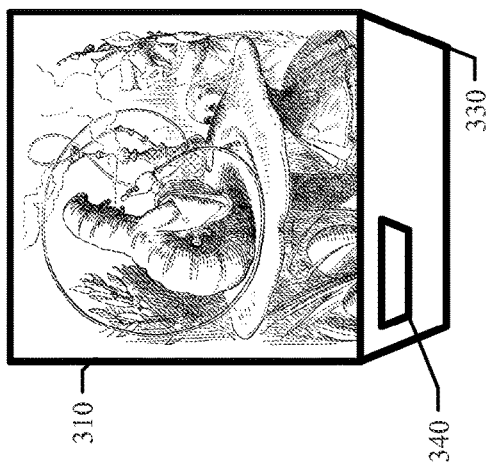
FIGS. 4A-4D illustrate an example portion of an animation sequence.
Figure 4B:
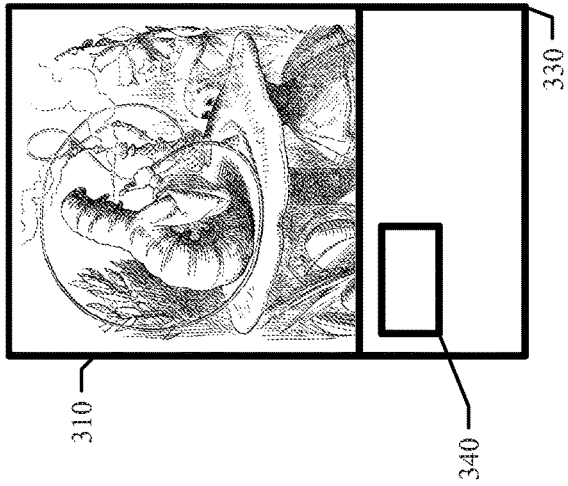
Figure 4C:
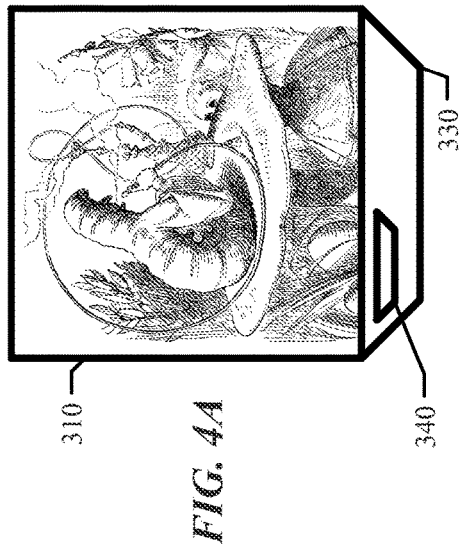
Figure 4D:
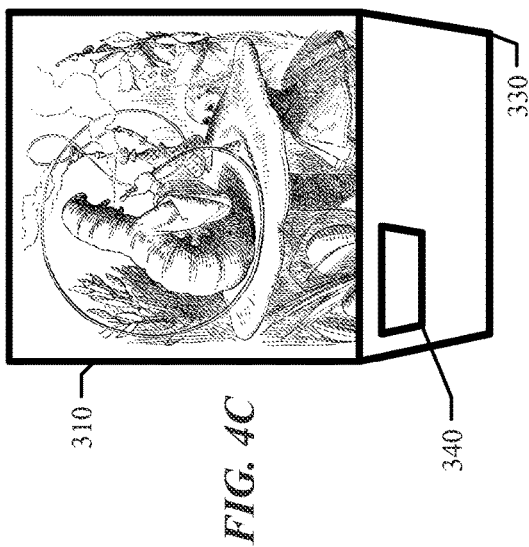

In the examples of FIGS. 4A-4D, information panel 330 includes an information element 340 which may be any type of information associated with image element 310 that is to be displayed (including, e.g., any type of information described herein). As illustrated in FIGS. 4A-4D, as image element 310 increases in size to its final size on a display, information panel 330 may appear to progressively swing down (e.g., similar in manner to a laterally suspended sign) from the bottom edge of image element 310. In FIG. 4A, for example, information panel 330 is in the early stages of the swing-down animation, such that it appears to be only partially visible to the user. This appearance of swinging down proceeds further in FIGS. 4B and 4C until image element 310 reaches its final display size in FIG. 4D, and information panel 330 (and information element 340) also reach their final display size, with the animation of the panel swinging down being complete.

Figure 5:
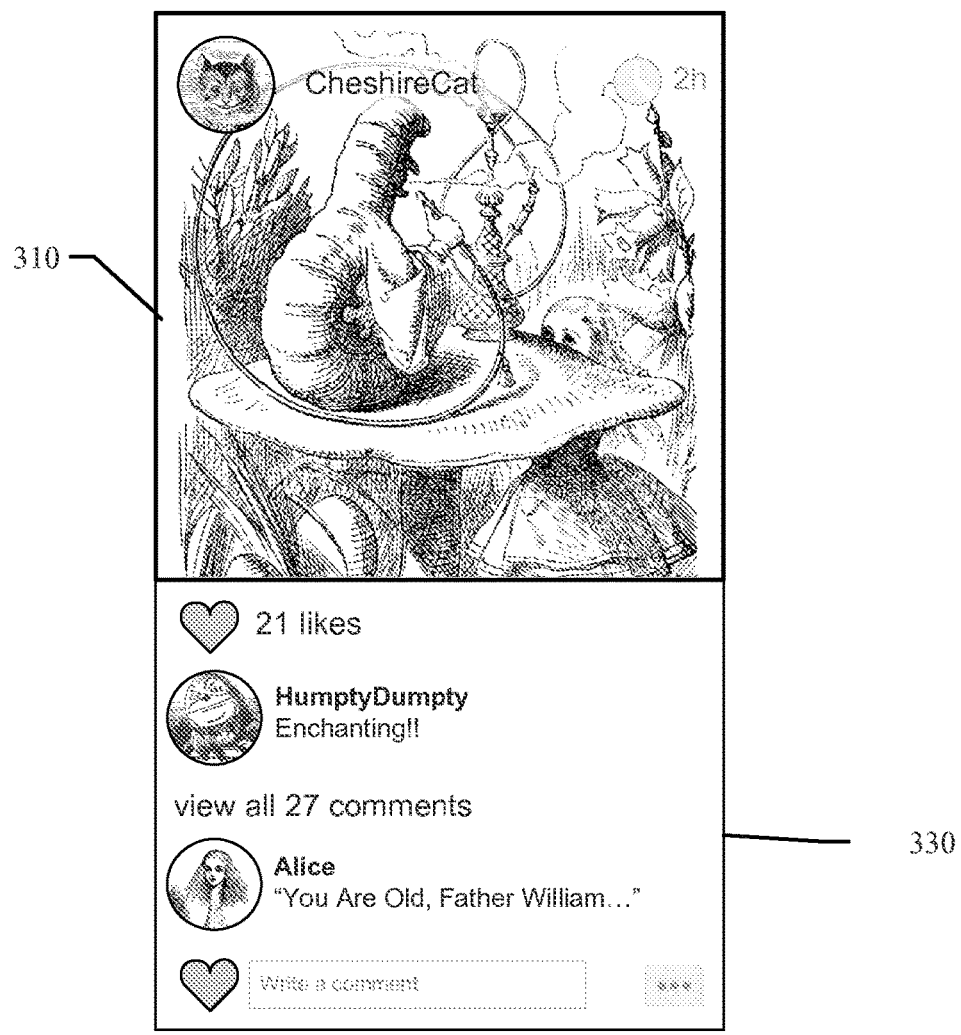
FIG. 5 illustrates example information associated with an image element in information panel 330.

FIG. 5 illustrates example information associated with image element 310 in information panel 330. As illustrated in FIG. 5, the information associated with image element 310 may include a username (e.g., "Alice") of a user who is the originator (e.g., uploader) of image element 310, an image or likeness associated with the originator (e.g., an avatar or profile picture), an indication (e.g., usernames, images, or both) of one or more other users (e.g., "CheshireCat" and "HumptyDumpty") who have interacted with image element 310 (e.g., by "liking" or "favoriting", commenting upon, or sharing image element 310), the number of total comments posted, the content of a subset of the posted comments, an indication of the number of users who have interacted with (e.g., "liked" or "favorited") image element 310, or any other suitable information associated with image element 310 (e.g., a caption associated with the image element, one or more tags of users or other entities associated with the image element, data associated with a location, date, or time associated with the image element, etc.). Information panel 330 may also include one or more interactive UI elements for interacting with image element 310 including, for example, a button for "liking" or "favoriting" the image element, an area for commenting on image element 310, and a button to access further options. The position or size (e.g., dimensions) of information panel 330 may, for example, be predetermined and may depend on the characteristics of the computing device on which image element 310 and information panel 330 are displayed.

Information panel 330 may, for example, include content that extends beyond the portion of information panel 330 that is visible to a user on a display region of a computing device. For example, in the example of FIG. 5, there are 27 total comments associated with image element 310, and only two of these comments (from "cheshire cat" and "alice") are initially displayed to the user in the visible portion of information panel 330. As such, if the user desires to view other comments associated with image element 310, the user may provide gesture input (e.g., by touching the link to "view all 27 comments") that makes the additional comments available for viewing. Since these additional comments may not all be visible simultaneously in the viewable region of information panel 330, the user may scroll through these comments (e.g., using one or more gestures associated with scrolling).

In particular embodiments, as the user scrolls down through the comments, the portion of image element 310 that is displayed to the user is reduced (e.g., as it scrolls up to allow more comments to scroll onto the viewable region); in particular embodiments, at least a portion of image element 310 may always remain visible in the display region of the computing device. As such, even if the user has scrolled down deep into a list of comments, the user may quickly jump back to the top of the comments list (or to the original view presented to the user, as illustrated in FIG. 5) by simply providing input in reference to the remaining visible portion of image element 310. For example, the user may tap the remaining visible portion of image element 310 (which may, for example, be the bottom-most portion of image element 310 that is of a predetermined size and is shown in a predetermined portion of the display region) and immediately be transported to the top of the comments list or to the original view presented to the user. In this manner, the user may be able to avoid having to perform multiple gestures (e.g., swiping down) to scroll upward through the expanded comments list in information panel 330. The adjustment of a content item (such as, for example, an image element 310) as a user scrolls through comments associated with the content item is discussed in further detail in Ser. No.

13/677,247, titled "Comment Presentation" and filed 14 Nov. 2012, which is incorporated herein by reference.

In particular embodiments, an image element such as image element 310 may be associated with a video. The presentation and behavior of video objects presented in a user interface is discussed in further detail in Ser. No. 13/490,343, titled "Video Object Behavior in a User Interface" and filed 6 Jun. 2012, which is incorporated herein by reference. The image displayed for image element 310 may, for example, be a still frame from some part of the video (e.g., the first frame of the video, the last frame of the video, or any other suitable frame in the video). If image element 310 is associated with a video, then upon user selection of image element 310 within the display layout and upon completion of the animation sequence responsive to the user's selection (e.g., as illustrated in FIG. 3F), the video associated with image element 310 may begin automatically playing. In the example of FIG. 3F, the video (e.g., of Alice reciting the poem "You Are Old, Father William") would play in the region originally occupied by the still frame of image element 310. The video may begin playing, for example, starting with the still frame displayed for image element 310 in the display layout of image elements. Alternatively, the video may begin playing from another point, such as the beginning frame of the video. The video may, for example, play once and then stop or, alternatively, the video may play in a continuous loop until further input is received from a user to pause, stop, or dismiss the image element associated with the video. In particular embodiments, an image element associated with a video may display a video icon (or other suitable indication) that notifies the user that image element 310 is associated with a video that may be played (or that is already playing).

Once a user is finished interacting with image element 310 that is displayed as, for example, in FIG. 3F or 5, the user may dismiss the image element with additional user input. In particular embodiments, the user may select (e.g., by touch input) an icon or button (e.g., an "x") that closes or dismisses image element 310. In other embodiments, the user may perform any suitable gesture (e.g., a flick or a swipe in a particular direction) to close or dismiss image element 310.

In particular embodiments, the state of the user's interaction with image element 310 and/or information panel 330 may be preserved upon closing/dismissing image element 310. If the image element is associated with a video, and if the video is playing when input is received from the user to close or dismiss the image element, then the video may stop or, alternatively, may pause at the frame displayed when the user's input to dismiss was received.

Upon receipt of user input to dismiss image element 310 (in this example, a swipe gesture), another animation sequence responsive to the user's input may occur. This animation sequence may "mirror," or reverse the animation sequence that occurred upon the user's initial selection of image element 310 (as illustrated in FIGS. 3A-3F). For example, if image element 310 is displayed with an information panel 330 that swung down in an animation sequence responsive to a user selecting image element 330 from the display layout, then the dismissal animation sequence may show information panel 330 swinging back up (e.g., disappearing behind image element 310 as image element 310 shrinks in size). As another example, image element 310 may gradually decrease in size, additional image elements 320 and information 330 may move out of view or disappear, and the original display layout may again appear. The animation sequence may depict adjacent image elements in the display layout moving into the space vacated by image element 310 as it shrinks in size. At the conclusion of the dismissal animation sequence, image element 310 may once again return to its original position (and size, scale, cropping, aspect ratio, etc.) within the display layout. If image element 310 was associated with a video, the frame of the video displayed at the moment when the user's input to dismiss image element 310 was received (or, alternatively, the first frame of the video, if the video is stopped) may be the new image displayed for image element 310 in the display layout.

In particular embodiments, during an animation sequence, any animated content elements (e.g., image element, information panel) may change in scale, resolution, transparency, contrast, brightness, aspect ratio, amount of cropping, or any other visual aspect of the content item. In particular embodiments, the user may be able to provide gesture input to interrupt and/or reverse an animation sequence prior to completion of the animation sequence (e.g., if the user accidentally selected the wrong image element, and the image element begins increasing in size and/or an information panel begins swinging down, the user may be able to interrupt and reverse the animation sequence in order to quickly restore the layout view and select the desired image element). In particular embodiments, the user may be able to provide gesture input to speed up and/or "short-circuit" an animation sequence in the middle of the animation process if the user just wants to quickly view the full-screen version of the image element.

Figure 6:
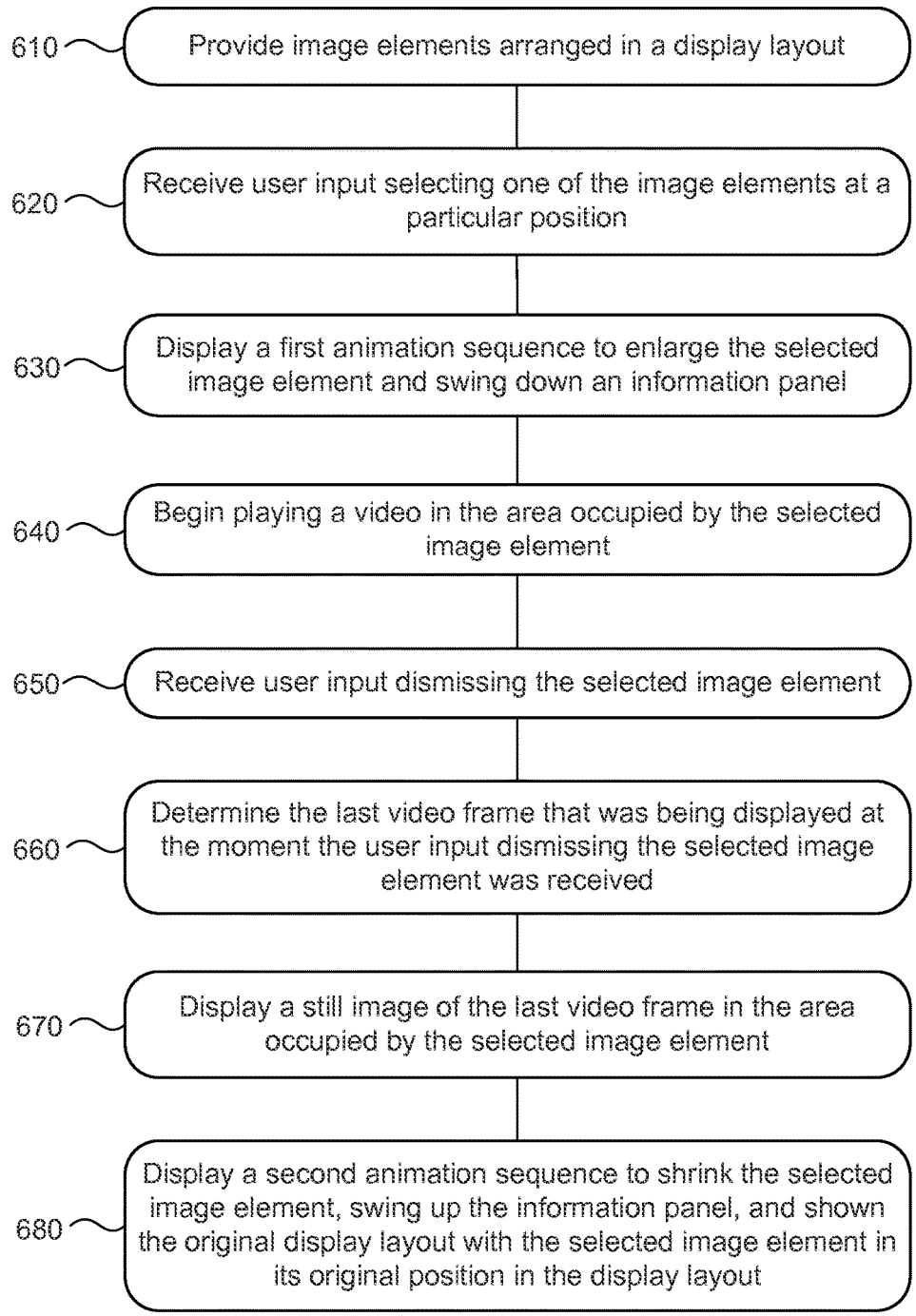
FIG. 6 illustrates an example method for displaying animation sequences for concurrently-displayed image elements in a display layout.

FIG. 6 illustrates an example method 600 for displaying animation sequences for concurrently-displayed image elements in a display layout. The method may begin at step 610, where a computing system provides image elements in a display layout. At step 620, the computing system receives user input selecting one of the image elements at a particular position in the display layout.

At step 630, the computing system displays a first animation sequence to enlarge the selected image element and depict the information panel as appearing and swinging down to be displayed. In particular embodiments, step 630 may comprise two concurrently playing animation sequences: one for enlarging the selected image element, and another to depict the information panel as appearing and swinging down.

At step 640, if the selected image element is associated with a video, playback of the video may immediately follow completion of the first animation sequence (once the selected image element has been fully enlarged). In particular embodiments, if the video was previously played by the user in this display layout, video playback may begin at some other frame besides the first frame (e.g., wherever the user last left off or paused the video). The video may be displayed in the space occupied by the selected image element.

At step 650, the computing system receives user input dismissing the selected image element. If the selected image element is associated with a video, then in step 660, the computing system may determine the last video frame that was being displayed at the moment the user input dismissing the selected image element was received, and in step 670, the computing system may display that last video frame in the area occupied by the selected image element.

In step 680, the computing system may display a second animation sequence to shrink the selected image element and depict the information panel as swinging up and disappearing. In particular embodiments, step 680 may comprise two concurrently playing animation sequences: one for shrinking the selected image element, and another to depict the information panel as swinging up and disappearing.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for displaying animation sequences for concurrently-displayed image elements in a display layout including the particular steps of the method of FIG. 6, this disclosure contemplates any suitable method for displaying animation sequences for concurrently-displayed image elements in a display layout including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
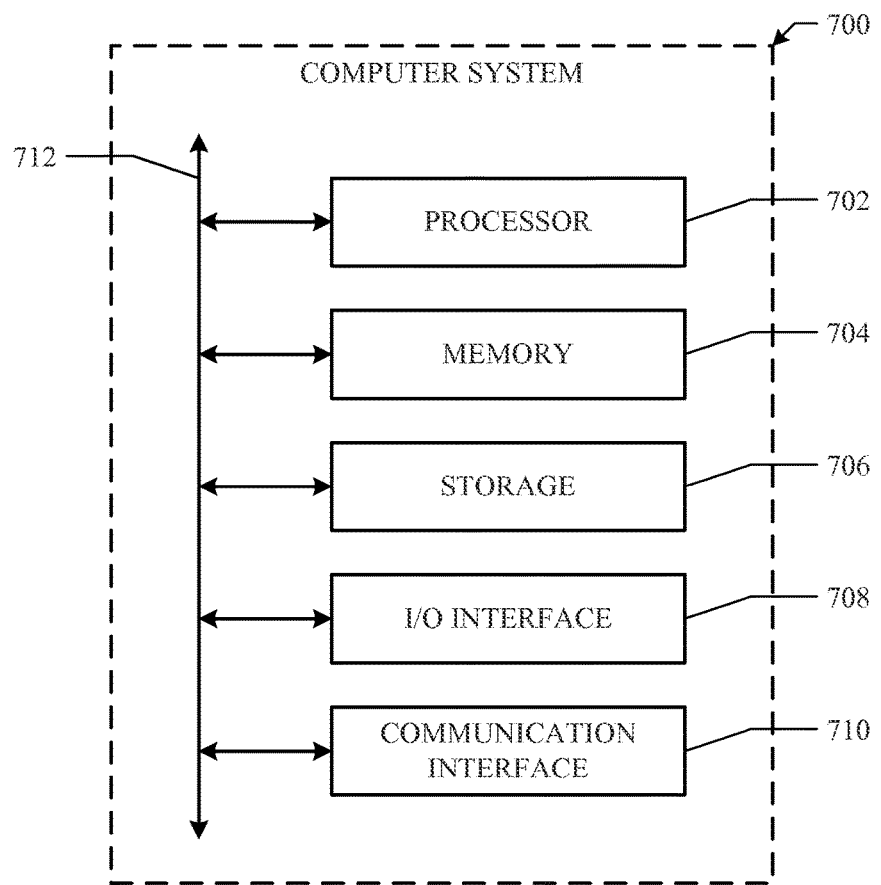
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, providing a plurality of image elements arranged in a display layout, each of the image elements comprising content associated with one or more entities corresponding to one or more nodes of a social graph, respectively, wherein the social graph comprises a plurality of nodes and a plurality of edges connecting the nodes;
   by the computing device, receiving a first user input selecting one of the image elements, the selected image element being associated with an originating user that is an originator of the selected image element, wherein the originating user corresponds to a first node of the plurality of nodes;
   by the computing device, in response to the first user input, providing for display a first animation sequence to enlarge the selected image element until the selected image element reaches a pre-determined size with respect to a display of the computing device while moving all remaining image elements of the plurality of image elements off the display of the computing device;
   by the computing device, providing for display a second animation sequence for an information panel associated with the enlarged selected image element, wherein the second animation sequence comprises the information panel swinging down from a bottom edge of the enlarged selected image element from a first partially-visible state in which the information panel appears laterally suspended along a plane different from the enlarged selected image element to a second fully-visible state in which the information panel is displayed adjacent to the enlarged selected image element on a same plane as the enlarged selected image element; and
   by the computing device, displaying social information associated with the selected image element in the information panel, the social information comprising an image element of the originating user and one or more other users who have interacted with the selected image element, the one or more other users corresponding to one or more second nodes of the plurality of nodes, respectively, each of the second nodes being connected to the first node by an edge in the social graph.

2. The method of claim 1, wherein the selected image element is one of a plurality of image elements being concurrently displayed, and wherein an information panel is displayed for only one of the concurrently displayed image elements at any given time.

3. The method of claim 1, wherein the selected image element is one of a plurality of image elements being concurrently displayed, and wherein an information panel may be concurrently displayed for two or more of the concurrently-displayed image elements at once.

4. The method of claim 1, further comprising:
   in response to the first user input, displaying the second animation sequence to enlarge the selected image element until the selected image element reaches a pre-determined size with respect to the display of the computing device, wherein the second animation sequence is displayed concurrently with the first animation sequence.

5. The method of claim 4, further comprising:
   receiving second user input to dismiss the selected image element;
   and
   in response to the second user input, displaying a third animation sequence to shrink the selected image element.

6. The method of claim 5, further comprising:
   in response to the second user input, displaying a fourth animation sequence that shows the information panel swing up and eventually disappear, wherein the fourth animation sequence is displayed concurrently with the third animation sequence.

7. The method of claim 5, wherein the selected image element was arranged in at a particular position in the display layout prior to receiving the first user input, further comprising:
   providing for presentation the display layout after completion of the third animation sequence, wherein the selected image element is shown within the display layout in the particular position.

8. One or more computer-readable non-transitory storage media embodying software that is operable when executed by one or more processors to:
   provide a plurality of image elements arranged in a display layout, each of the image elements comprising content associated with one or more entities corresponding to one or more nodes of a social graph, respectively, wherein the social graph comprises a plurality of nodes and a plurality of edges connecting the nodes;
   receive a first user input selecting one of the image elements, the selected image element being associated with an originating user that is an originator of the selected image element, wherein the originating user corresponds to a first node of the plurality of nodes;
   provide, in response to the first user input, for display a first animation sequence to enlarge the selected image element until the selected image element reaches a pre-determined size with respect to a display of a computing device while moving all remaining image elements of the plurality of image elements off the display of the computing device;
   provide for display a second animation sequence for an information panel associated with the enlarged selected image element, wherein the second animation sequence comprises the information panel swinging down from a bottom edge of the enlarged selected image element from a first partially-visible state in which the information panel appears laterally suspended along a plane different from the enlarged selected image element to a second fully-visible state in which the information panel is displayed adjacent to the enlarged selected image element on a same plane as the enlarged selected image element; and display social information associated with the selected image element in the information panel, the social information comprising an image element of the originating user and one or more other users who have interacted with the selected image element, the one or more other users corresponding to one or more second nodes of the plurality of nodes, respectively, each of the second nodes being connected to the first node by an edge in the social graph.

9. The media of claim 8, wherein the selected image element is one of a plurality of image elements being concurrently displayed, and wherein an information panel is displayed for only one of the concurrently displayed image elements at any given time.

10. The media of claim 8, wherein the selected image element is one of a plurality of image elements being concurrently displayed, and wherein an information panel may be concurrently displayed for two or more of the concurrently-displayed image elements at once.

11. The media of claim 8, the software being further operable when executed by one or more processors to:

in response to the first user input, display the second animation sequence to enlarge the selected image element until the selected image element reaches a pre-determined size with respect to the display of the computing device, wherein the second animation sequence is displayed concurrently with the first animation sequence.

12. The media of claim 11, the software being further operable when executed by one or more processors to:

receive second user input to dismiss the selected image element; and in response to the second user input, display a third animation sequence to shrink the selected image element.

13. The media of claim 12, the software being further operable when executed by one or more processors to:

in response to the second user input, display a fourth animation sequence that shows the information panel swing up and eventually disappear, wherein the fourth animation sequence is displayed concurrently with the third animation sequence.

14. The media of claim 12, wherein the selected image element was arranged in at a particular position in the display layout prior to receiving the first user input, the software being further operable when executed by one or more processors to:

provide for presentation the display layout after completion of the third animation sequence, wherein the selected image element is shown within the display layout in the particular position.

15. A system comprising: one or more processors; and a memory coupled to the processors comprising instructions executable by the processors, the processors being operable when executing the instructions to:

provide a plurality of image elements arranged in a display layout, each of the image elements comprising content associated with one or more entities corresponding to one or more nodes of a social graph, respectively, wherein the social graph comprises a plurality of nodes and a plurality of edges connecting the nodes;

receive a first user input selecting one of the image elements, the selected image element being associated with an originating user that is an originator of the selected image element, wherein the originating user corresponds to a first node of the plurality of nodes;

provide, in response to the first user input, for display a first animation sequence to enlarge the selected image element until the selected image element reaches a pre-determined size with respect to a display of a computing device while moving all remaining image elements of the plurality of image elements off the display of the computing device;

provide for display a second animation sequence for an information panel associated with the enlarged selected image element, wherein the second animation sequence comprises the information panel swinging down from a bottom edge of the enlarged selected image element from a first partially-visible state in which the information panel appears laterally suspended along a plane different from the enlarged selected image element to a second fully-visible state in which the information panel is displayed adjacent to the enlarged selected image element on a same plane as the enlarged selected image element; and display social information associated with the selected image element in the information panel, the social information comprising an image element of the originating user and one or more other users who have interacted with the selected image element, the one or more other users corresponding to one or more second nodes of the plurality of nodes, respectively, each of the second nodes being connected to the first node by an edge in the social graph.

16. The system of claim 15, wherein the selected image element is one of a plurality of image elements being concurrently displayed, and wherein an information panel is displayed for only one of the concurrently displayed image elements at any given time.

17. The system of claim 15, wherein the selected image element is one of a plurality of image elements being concurrently displayed, and wherein an information panel may be concurrently displayed for two or more of the concurrently-displayed image elements at once.

18. The system of claim 15, the processors being further operable when executing the instructions to:

in response to the first user input, display the second animation sequence to enlarge the selected image element until the selected image element reaches a pre-determined size with respect to the display of the computing device, wherein the second animation sequence is displayed concurrently with the first animation sequence.

19. The system of claim 18, the processors being further operable when executing the instructions to:

receive second user input to dismiss the selected image element; and in response to the second user input, display a third animation sequence to shrink the selected image element.

20. The system of claim 19, the processors being further operable when executing the instructions to:

in response to the second user input, display a fourth animation sequence that shows the information panel swing up and eventually disappear, wherein the fourth animation sequence is displayed concurrently with the third animation sequence.

* * * * *